United States Patent
Johnston et al.

(10) Patent No.: US 9,856,748 B2
(45) Date of Patent: Jan. 2, 2018

(54) PROBE TIP COOLING

(71) Applicant: United Technologies Corporation, Hartford, CT (US)

(72) Inventors: Blaine M. Johnston, Lyman, ME (US); Mark A. Torrance, Waterboro, ME (US); Steven G. Lemieux, South Windsor, CT (US); Dmitriy A. Romanov, Wells, ME (US)

(73) Assignee: United Technologies Corporation, Farmington, MN (US)

( * ) Notice: Subject to any disclaimer, the term of this patent is extended or adjusted under 35 U.S.C. 154(b) by 379 days.

(21) Appl. No.: 14/625,370

(22) Filed: Feb. 18, 2015

(65) Prior Publication Data
US 2016/0237851 A1    Aug. 18, 2016

(51) Int. Cl.
| | | |
|---|---|---|
| *H05K 7/20* | (2006.01) | |
| *F01D 25/12* | (2006.01) | |
| *F01D 11/20* | (2006.01) | |
| *F01D 17/02* | (2006.01) | |
| *G01B 21/16* | (2006.01) | |
| *G01S 7/02* | (2006.01) | |
| *G01S 13/08* | (2006.01) | |
| *G01M 15/14* | (2006.01) | |

(52) U.S. Cl.
CPC ............ *F01D 25/12* (2013.01); *F01D 11/20* (2013.01); *F01D 17/02* (2013.01); *G01B 21/16* (2013.01); *G01S 7/02* (2013.01); *G01S 13/08* (2013.01); *G01S 2007/027* (2013.01); *Y02T 50/675* (2013.01)

(58) Field of Classification Search
CPC ....................................................... F01D 11/20
See application file for complete search history.

(56) References Cited

U.S. PATENT DOCUMENTS

| | | | | |
|---|---|---|---|---|
| 7,918,642 | B2 * | 4/2011 | Leogrande | ............ F01D 11/025 415/118 |
| 8,184,151 | B2 * | 5/2012 | Zombo | ................. F01D 21/003 348/82 |
| 2012/0032689 | A1 * | 2/2012 | Phillips | ................... F01D 11/20 324/629 |
| 2014/0064924 | A1 * | 3/2014 | Warren | .................... G01B 7/14 415/118 |

* cited by examiner

*Primary Examiner* — Igor Kershteyn
*Assistant Examiner* — Kayla McCaffrey
(74) *Attorney, Agent, or Firm* — Kinney & Lange, P.A.

(57) ABSTRACT

A probe cooling system for a gas turbine engine includes a probe housing and a bushing disposed between an end of the probe housing and a gas path, the bushing extending from the end of the probe housing to form a cavity. The system also includes a first plenum defined within the probe housing and configured to direct air from an internal cooling air supply towards the cavity. The system also includes a second plenum defined between the bushing and the probe housing and configured to direct air from the internal cooling air supply towards the cavity.

14 Claims, 8 Drawing Sheets

PROBE TIP COOLING

BACKGROUND

The present disclosure relates generally to gas turbine engines and, more particularly, to turbine blade sealing structures. Specifically, the disclosure concerns probes within turbine blade sealing structures.

A gas turbine engine typically includes a high-pressure spool, a combustion system, and a low-pressure spool disposed within an engine case to form a generally axial, serial flow path about the engine centerline. The high-pressure spool includes a high-pressure turbine, a high-pressure shaft extending axially forward from the high-pressure turbine, and a high-pressure compressor connected to a forward end of the high-pressure shaft. The low-pressure spool includes a low-pressure turbine, which is disposed downstream of the high-pressure turbine, a low-pressure shaft, which typically extends coaxially through the high-pressure shaft, and a low-pressure compressor connected to a forward end of the low-pressure shaft, forward of the high-pressure compressor. The combustion system is disposed between the high-pressure compressor and the high-pressure turbine and receives compressed air from the compressors and fuel provided by a fuel injection system. A combustion process is carried out within the combustion system to produce high-energy gases to produce thrust and turn the high- and low-pressure turbines, which drive the compressors to sustain the combustion process.

Turbine blade outer air seals (BOAS) seal turbine gas path air between the rotating blades of the turbine and the gas path surface of a casing. The distance between the tip of the blades and the surface of the BOAS greatly impacts turbine efficiency. Reducing that distance as much as possible improves engine efficiency. Accordingly, efforts have been made to monitor blade tip clearance during engine operation. However, extremely high temperatures in the gas path often make such monitoring difficult.

The operating temperature of a typical probe is lower than that of the gas path of a turbine engine. Current methods of cooling probe tips exposed to the gas path include supplying cooling air from an external cooling source. Cooling a probe tip in this manner necessitates a coolant, such as liquid nitrogen, and plumbing to deliver the coolant to the probe tip.

SUMMARY

A probe cooling system for a gas turbine engine includes a probe housing and a bushing disposed between an end of the probe housing and a gas path, the bushing extending from the end of the probe housing to form a cavity. The system also includes a first plenum defined within the probe housing and configured to direct air from an internal cooling air supply towards the cavity. The system also includes a second plenum defined between the bushing and the probe housing and configured to direct air from the internal cooling air supply towards the cavity.

A method of cooling a probe includes positioning a probe having a probe tip proximate a gas path, and directing air from an internal cooling air supply through a plurality of plenums towards the probe tip.

DETAILED DESCRIPTION

Figure 1:
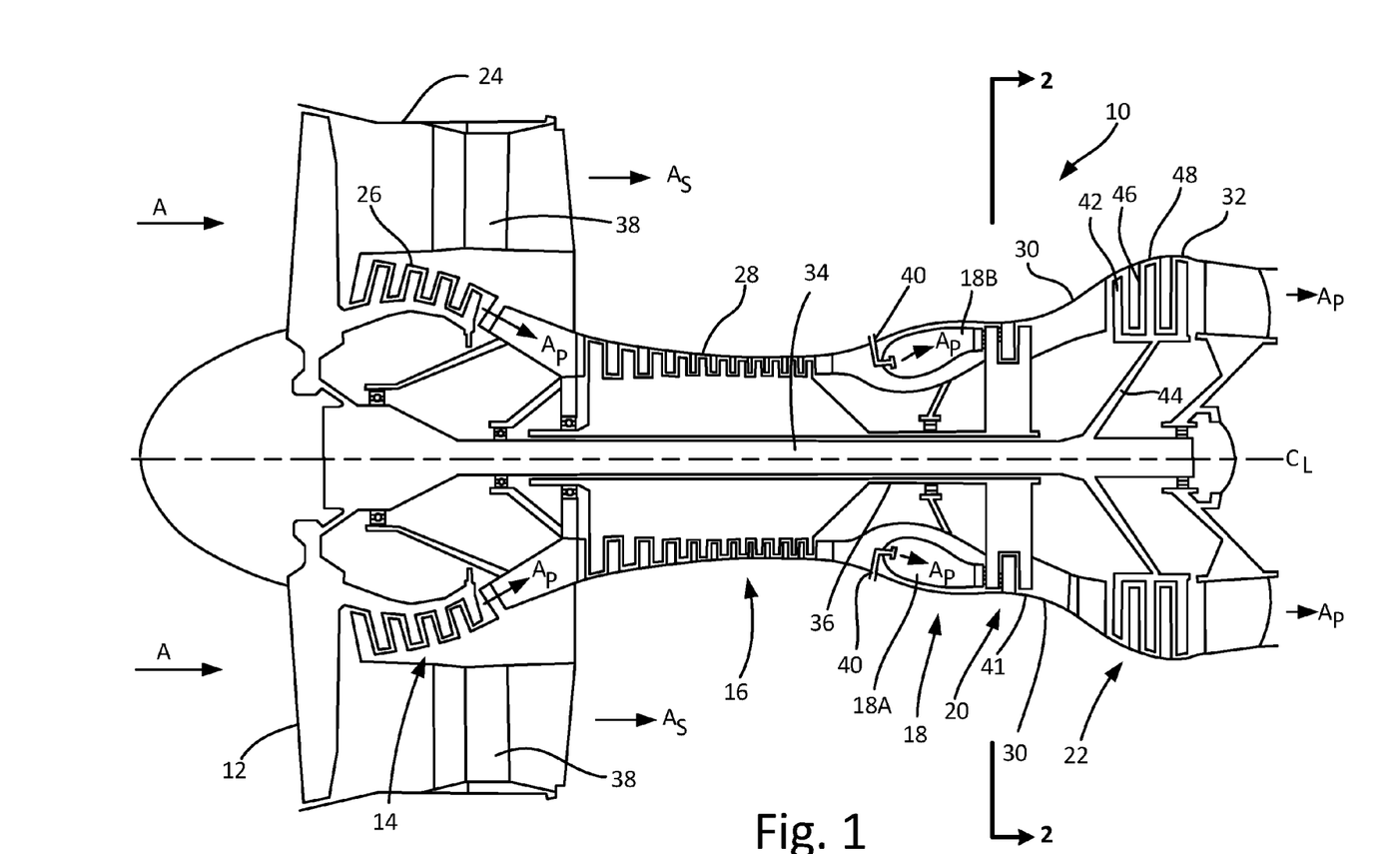
FIG. 1 is a schematic side cross section view of a gas turbine engine.

In FIG. 1, a cross section of gas turbine engine 10 is shown. Although FIG. 1 depicts a gas turbine engine typically used for aircraft propulsion, the invention is readily applicable to gas turbine generators and other similar systems incorporating rotor-supported, shaft-driven turbines. Shown in FIG. 1 are gas turbine engine 10, fan 12, low-pressure compressor (LPC) 14, high-pressure compressor (HPC) 16, combustor section 18, HPT 20, low-pressure turbine (LPT) 22, fan case 24, LPC case 26, HPC case 28, HPT case 30, LPT case 32, low-pressure shaft 34, high-pressure shaft 36, fan exit guide vanes 38, fuel injectors 40, HPT blades 41, LPT blades 42, support rotor 44, vane airfoil sections 46, case section 48, inlet air A, primary air $A_P$, secondary air $A_S$ (also known as bypass air), and longitudinal engine centerline axis $C_L$.

In the illustrated embodiment, gas turbine engine 10 includes a dual-spool turbofan engine in which the advantages of the present disclosure are particularly well-illustrated. Gas turbine engine 10, of which the operational principles are well-known in the art, comprises fan 12, LPC 14, HPC 16, combustor section 18, HPT 20, and LPT 22, which are each concentrically disposed around longitudinal engine centerline axis $C_L$. Fan 12 is enclosed at its outer diameter within fan case 24. Likewise, the other engine components are correspondingly enclosed at their outer diameters within various engine casings, including LPC case 26, HPC case 28, HPT case 30 and LPT case 32. Fan 12 and LPC 14 are connected to LPT 22 through low-pressure shaft 34. Together fan 12, LPC 14, LPT 22, and low-pressure shaft 34 make up the low-pressure spool. HPC 16 is connected to HPT 20 through high-pressure shaft 36. Together HPC 16, HPT 20, and high-pressure shaft 36 make up the high-pressure spool.

During normal operation, inlet air A enters gas turbine engine 10 where it is divided into streams of primary air $A_P$ and secondary air $A_S$ after passing through fan 12. Fan 12 is rotated by LPT 22 through low-pressure shaft 34 (either directly as shown or through a gearbox, not shown) to accelerate secondary air $A_S$ through exit guide vanes 38, thereby producing a major portion of the thrust output of gas turbine engine 10. Primary air $A_P$ (also known as gas path air) is directed first into LPC 14 and then into HPC 16. LPC 14 and HPC 16 work together to incrementally increase the pressure of primary air A. HPC 16 is rotated by HPT 20 through low-pressure shaft 34 to provide compressed air to combustor section 18. The compressed air is delivered to combustors 18A and 18B, along with fuel through injectors 40, such that a combustion process can be carried out to produce the high-energy gases necessary to turn HPT 20 and LPT 22. Primary air $A_P$ continues through gas turbine engine 10 whereby it is typically passed through an exhaust nozzle to further produce thrust.

After being compressed in LPC 14 and HPC 16 and participating in a combustion process in combustors 18A and 18B to increase pressure and energy, primary air $A_P$ flows through HPT 20 and LPT 22 such that blades 41 and blades 42 extract energy from the flow of primary air A. Primary air $A_P$ impinges on HPT blades 41 to cause rotation of high-pressure shaft 36, which turns HPC 16. Primary air $A_P$ also impinges on LPT blades 42 to cause rotation of support rotor 44 and low-pressure shaft 34, turning fan 12 and LPC 14.

The components and configuration of gas turbine engine 10 as shown in FIG. 1 allow for a portion of primary air $A_P$ upstream of combustor section 18 to be transported downstream of combustor section 18 while bypassing combustor section 18. Because this air is relatively cool (having not gone through combustor section 18), the air can be used to cool components such as blade outer air seal (BOAS) 50 (described below in greater detail and shown in FIG. 2). This cooling is advantageous because the high temperature levels in HPT 20 and LPT 22 can complicate the monitoring of engine components during the operation of a production engine.

Depicted in FIG. 1 is one embodiment of the present disclosure, to which there are alternative embodiments. For example, engine 10 can be a three spool engine. In such an embodiment, engine 10 has an intermediate pressure compressor (IPC) between LPC 14 and HPC 16 and an intermediate pressure turbine (IPT) between HPT 20 and LPT 22, wherein the intermediate pressure compressor is connected to the intermediate pressure turbine with an additional shaft.

Figure 2:
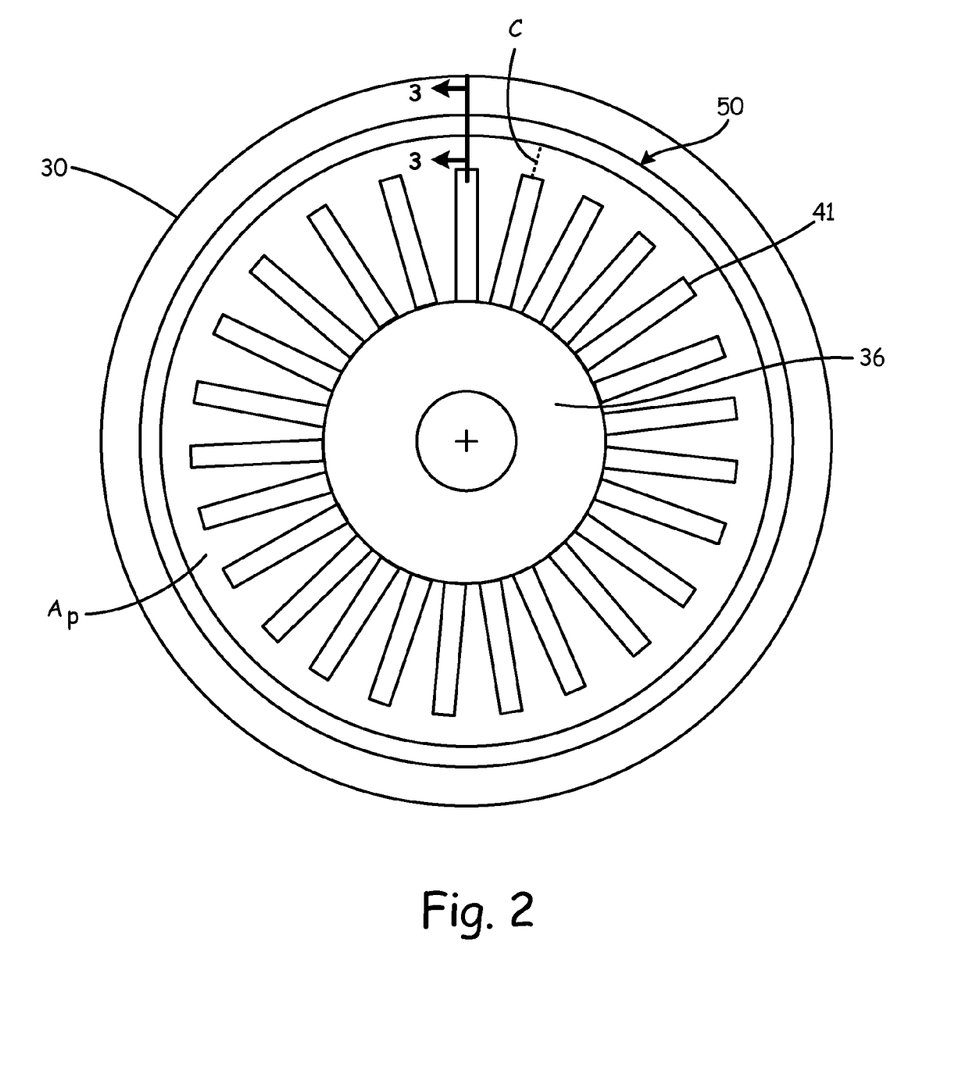
FIG. 2 is a simplified cross section view illustrating the relationship between a BOAS and high-pressure turbine (HPT) blades taken along the line 2-2 of FIG. 1, not to scale.

FIG. 2 is a simplified cross-sectional view illustrating the relationship between BOAS 50 and HPT blades 41 taken along the line 2-2 of FIG. 1. HPT blades 41 are attached to high-pressure shaft 36, and primary air, or gas path air, $A_P$ is shown in the space between HPT blades 41 and BOAS 50. Clearance C indicates the distance between BOAS 50 and HPT blades 41. During engine operation, rotating HPT blades 41 and BOAS 50 serve as a seal to prevent leakage of air, thus improving engine efficiency. In FIG. 2, clearance C is enlarged for the purposes of illustration. In practice, clearance C can be, for example, in a range of about 0.025 inches (0.064 centimeters) to 0.055 inches (0.14 centimeters) when the engine is cold and 0.000 to 0.035 inches (0.09 centimeters) during engine operation, depending on the specific operating conditions and rub events that may occur. By making clearance C as small as practicable, the air leakage past the blade tip can be reduced, thereby improving the efficiency and performance of gas turbine engine 10. Therefore, it is desirable to actively monitor the distance between HPT blades 41 and BOAS 50 during operation of gas turbine engine 10. However, the high temperatures of primary air $A_P$ in HPT 20 can make operating a sensor in HPT 20 environment difficult.

Figure 3:
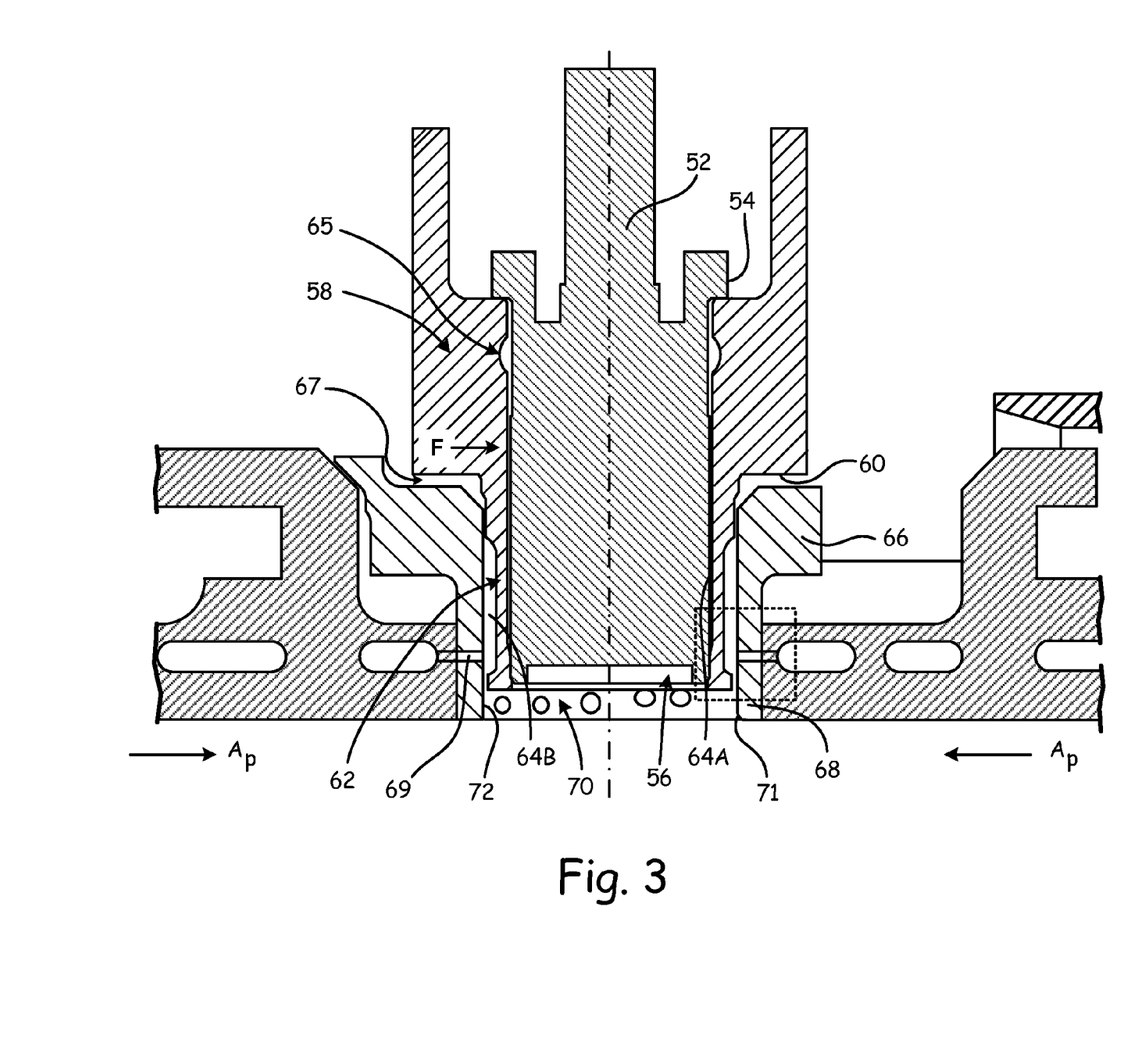
FIG. 3 is a cross section view of the BOAS of FIG. 2 (having a probe) taken along the line 3-3 of FIG. 2 (not to scale).

FIG. 3 is a cross-sectional view of BOAS 50 of FIG. 2 taken along the line 3-3 of FIG. 2. BOAS 50 includes probe 52. Probe 52 includes probe flange 54 and probe tip 56. Probe 52 is housed within housing 58, which includes housing flange 60 and housing tip 62. Housing 58 also includes pressurizing plenums 64A and 64B. Bushing 66 encloses a portion of housing tip 62. Specifically, bushing 66 encircles the sides of housing tip 62 such that the bottom of housing tip 62 is not enclosed. Bushing 66 includes bushing tip 68. Bushing tip 68 extends beyond housing tip 62 to create cavity 70. Bushing 66 also includes cooling plenums 72.

In embodiments of the present disclosure, probe 52 is a microwave sensor for measuring the distance between BOAS 50 and HPT blades 41. In alternative embodiments, probe 52 can be any type of probe. For example, probe 52 can be a non-intrusive stress measurement probe, or a temperature sensor. In the present embodiment, probe 52 is installed in BOAS 50. In alternative embodiments, probe 52 can be used for monitoring an engine component or condition in any actively cooled environment within a hot environment such as within a turbine. Thus, probe 52 can be installed in a turbine environment having a higher temperature than the operating temperature of probe 52. For example, probe 52 can be installed in a vane platform or turbine duct.

In embodiments of the present disclosure, a single probe 52 is housed within housing 58. In alternative embodiments, housing 58 can include multiple probes for monitoring different engine components or conditions. For example, housing 58 can hold both a microwave sensor probe and a non-intrusive stress measurement probe. In the present embodiment, probe housing 58 and bushing 66 are manufactured as separate parts and installed in BOAS 50. In alternative embodiments, BOAS 50 can be manufactured to include structures that function similarly to housing 58 and bushing 66 of the present disclosure.

Housing 58 can tightly hold probe 52 by applying force F to the exterior walls of probe 52. Probe 52 can also include flange 54 to prevent probe 52 from extending into cavity 70. Probe 52 can also include an additional structure or structures to seat probe 52 against housing 58. Housing 58 also includes housing flange 60 to prevent housing 58 from extending radially past bushing tip 68. In this manner, probe tip 56 is held close to flush with the radially inner end of housing tip 62, and the distance between probe tip 56 and primary air $A_P$ (cavity 70) created by bushing tip 68 is preserved. In one embodiment of the present disclosure, cavity 70 has a radial depth of about 0.050 inches (0.127 centimeters). In alternative embodiments, cavity 70 can be of any depth necessary to create a barrier of cooling air (described below in greater detail) between probe tip 56 and primary air A.

Pressurizing plenums 64A and 64B and cooling plenums 72 deliver air from an internal cooling air supply (not shown) to probe housing 58, bushing 66 and cavity 70. In embodiments of the present disclosure, the internal cooling air supply supplies air for cooling BOAS 50. In other embodiments, the internal cooling air supply can be air used to cool any number of engine components. Pressurizing plenums 64A and 64B divert air from the internal cooling air supply between housing 58 and probe 52 and between housing 58 and bushing 66, respectively. In one embodiment of the present disclosure, pressurizing plenums 64A receive air from the internal cooling air supply through one or more openings 65 in housing 58. The air fills spaces between probe 52 and housing 58. Pressurizing plenums 64B receive air from the internal cooling air supply between housing 58 and bushing 66 through passage 67 and cooling channel 69 (described in greater detail and shown in FIG. 5). In this manner, pressurizing plenums 64A and 64B prevent air delivered to cavity 70 via cooling plenums 72 from flowing back into probe housing 58. In other embodiments, pressurizing plenums 64A and 64B can direct air from the internal cooling air supply in any manner to prevent backflow of air from cooling plenums 72. Cooling plenums 72 deliver air from the internal cooling air supply towards cavity 70 through bushing 66. Holes 73 (described below in greater detail and shown in FIG. 4) in bushing tip 68 deliver air from the internal cooling air supply into cavity 70. In this manner, a barrier of cooling air between probe tip 56 and primary air $A_P$ is created. Thus, probe 52 can be installed in a production engine, where the high temperature of the gas path in HPT 20 would normally destroy probe function or even melt probe tip 56. Furthermore, no external cooling supply is needed to provide cooling air to the system.

Figure 4:
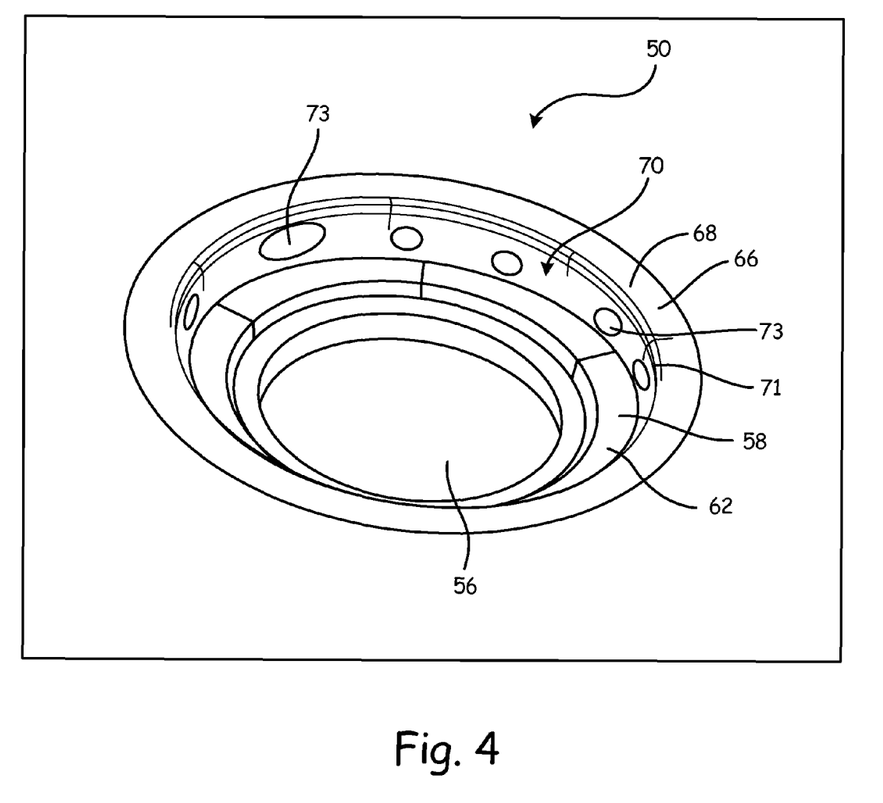
FIG. 4 is a perspective view of the inner diameter (ID) surface of the BOAS of FIG. 3.

FIG. 4 is a perspective view of the inner diameter (ID) surface of BOAS 50 of FIG. 3. BOAS 50 includes bushing 66 having bushing tip 68 and housing 58 having housing tip 62. Bushing tip 68 extends beyond housing tip 62 to create cavity 70. In some embodiments, downstream end 71 of bushing tip 68 is rounded (also see FIG. 3) to provide a smooth transition between cavity 70 and primary air $A_P$ in the hot gas path. In some embodiments, bushing tip 68 is welded to BOAS 50 only at the upstream end (i.e. the upstream half of bushing tip 68, not labeled). This allows bushing tip 68 to expand and contract during thermal changes. Holes 73 extend through bushing tip 68 to deliver cooling air from the internal cooling air supply towards cavity 70 via cooling plenums 72 (described below in greater detail and shown in FIG. 6).

Holes 73 are arranged around the perimeter of cavity 70. In the embodiment shown in FIG. 4, ten holes 73 are provided (not all holes 73 can be seen in this view). In alternative embodiments, any number of holes 73 sufficient to create a barrier of cooling air between probe tip 56 and primary air $A_P$ can be provided. In this manner, probe tip 56 of probe 52 can be located near enough primary air $A_P$ to take desired measurements of components in a production engine while the barrier of cooling air prevents the temperature of cavity 70 from rising above the operating temperature of probe 52.

Figure 5:
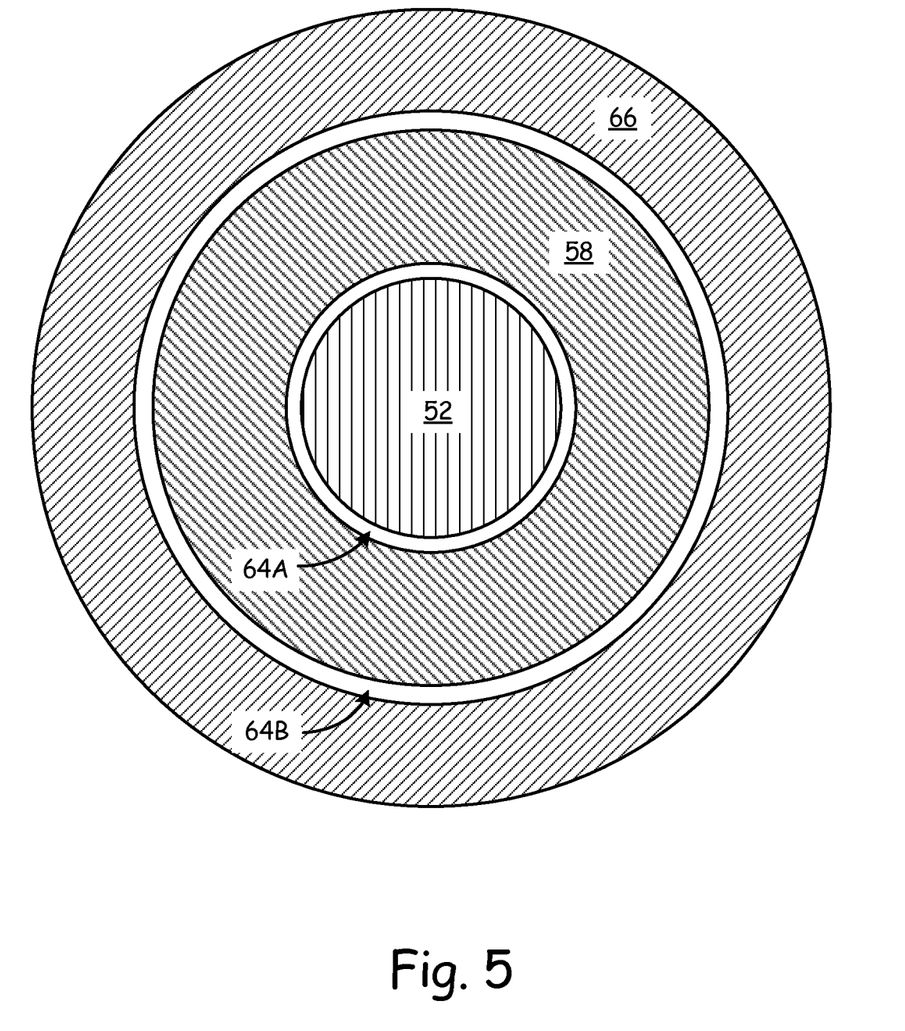
FIG. 5 is a cross section view illustrating a probe, a probe housing and bushing.

FIG. 5 is a cross section view of BOAS 50 of FIGS. 3 and 4 showing probe 52, housing 58, and bushing 66. Pressurizing plenums 64A and 64B deliver air from the internal cooling supply towards cavity 70 to prevent backflow of cooling air delivered to cavity 70 via cooling plenums 72. Pressurizing plenum 64A directs internal cooling air between probe 52 and housing 58, and pressurizing plenum 64B directs internal cooling air between housing 58 and bushing 66. In this manner, pressurizing plenums 64A and 64B prevent air delivered to cavity 70 via cooling plenums 72 and holes 73 from flowing back into probe housing 58. In other embodiments, pressurizing plenums 64A and 64B can direct internal cooling air in any manner to prevent backflow of air from cooling plenums 72 and holes 73.

Figure 6:
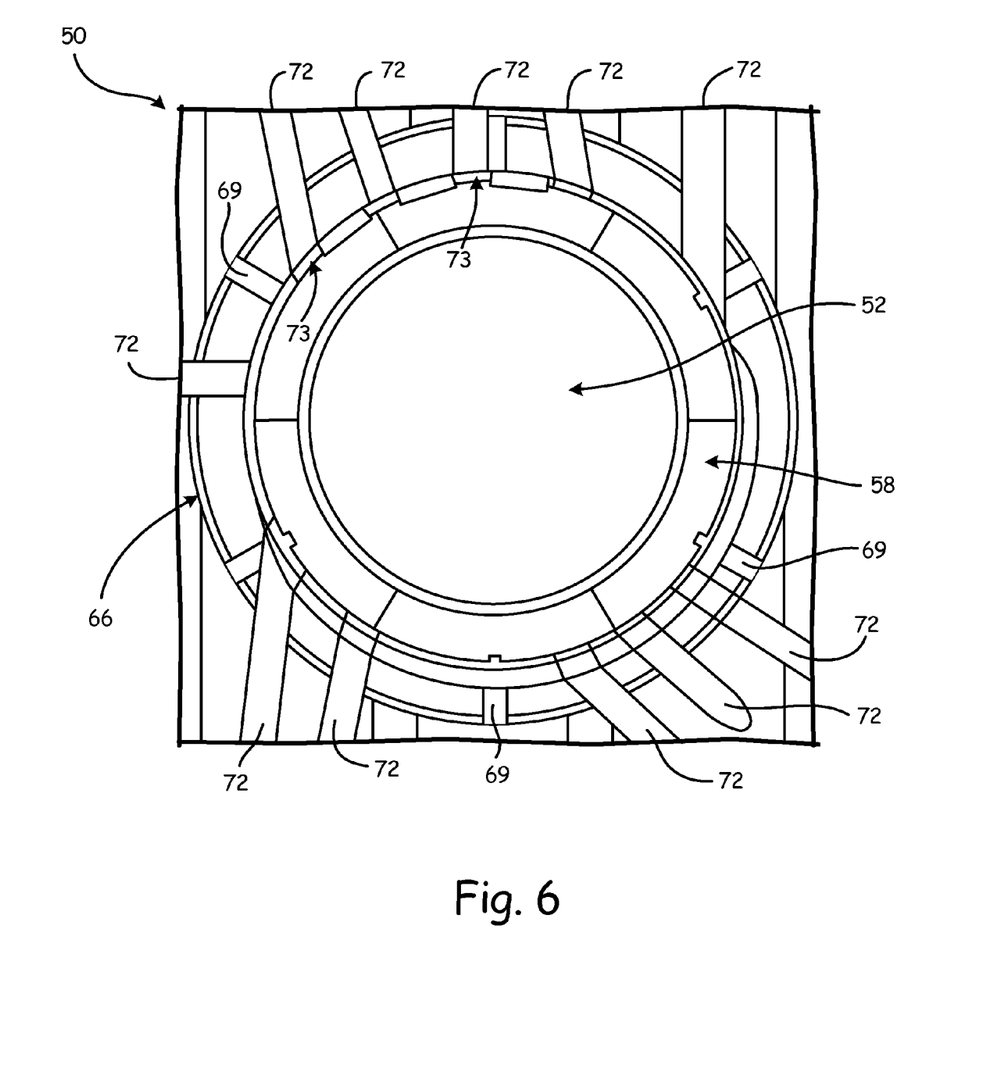
FIG. 6 is a cross section view of the of the ID surface of the BOAS of FIG. 3.

FIG. 6 is a cross section view of the of the ID surface of BOAS 50 of FIGS. 3-5. BOAS 50 includes probe 52, housing 58, and bushing 66. Cooling air plenums 72 deliver air from the internal cooling supply towards cavity 70 through bushing 66 to create a bather of cooling air between probe tip 56 and primary air A. Cooling channels 69 also supply air from BOAS 50 into pressurizing plenum 64B. In the embodiment shown in FIG. 6, ten cooling air plenums 72 direct internal cooling air through bushing 66. In other embodiments, any number of plenums or channels sufficient to create a barrier of cooling air between probe tip 56 and primary air $A_P$ can be used. Cooling air plenums 72 deliver cooling air to cavity 70 (not shown in FIG. 6) through holes 73. Cooling air delivered to cavity 70 creates a barrier that protects probe tip 56 from the high temperatures of primary air $A_P$. In this manner, probe 52 can be placed proximate a higher temperature zone than the operating temperature of probe 52 while still maintaining its monitoring capabilities.

Figure 7:
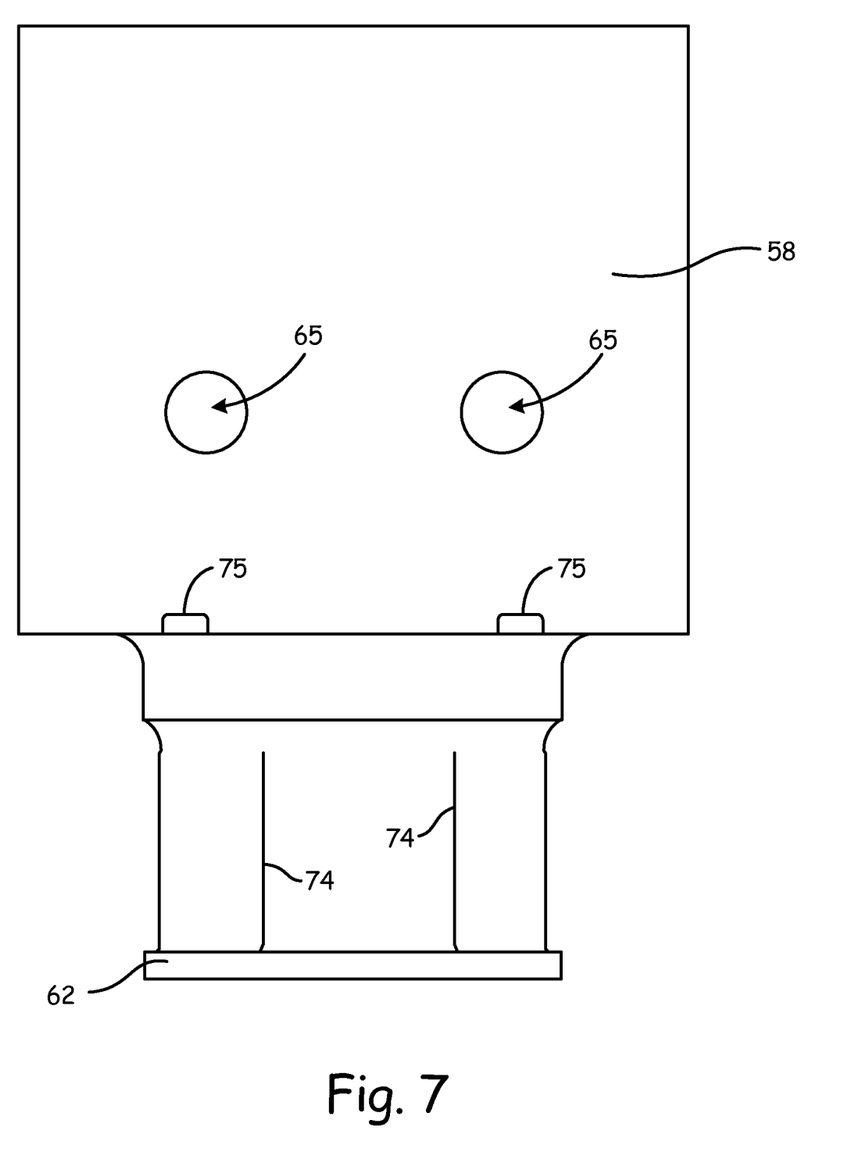
FIG. 7 is a side view of a probe housing.

In some embodiments, housing 58 can include radial splits to provide a tight fitting between probe 52 and housing 58. FIG. 7 illustrates a side view of housing 58 showing radial splits 74 and openings 65. As noted above, openings 65 provide ingress of air from the internal cooling air supply into pressurizing plenum 64A. Radial splits 74 provide a tight fit between probe 52 and housing 58 and eliminate hoop stress. Radial splits 74 can also reduce the leakage area so that the air pressure in pressurizing plenum 64A is greater than the air pressure in pressurizing plenum 64B, which is greater than the air pressure in cavity 70. FIG. 7 also illustrates slots 75 through which form passage 67 shown in FIG. 3.

Figure 8:
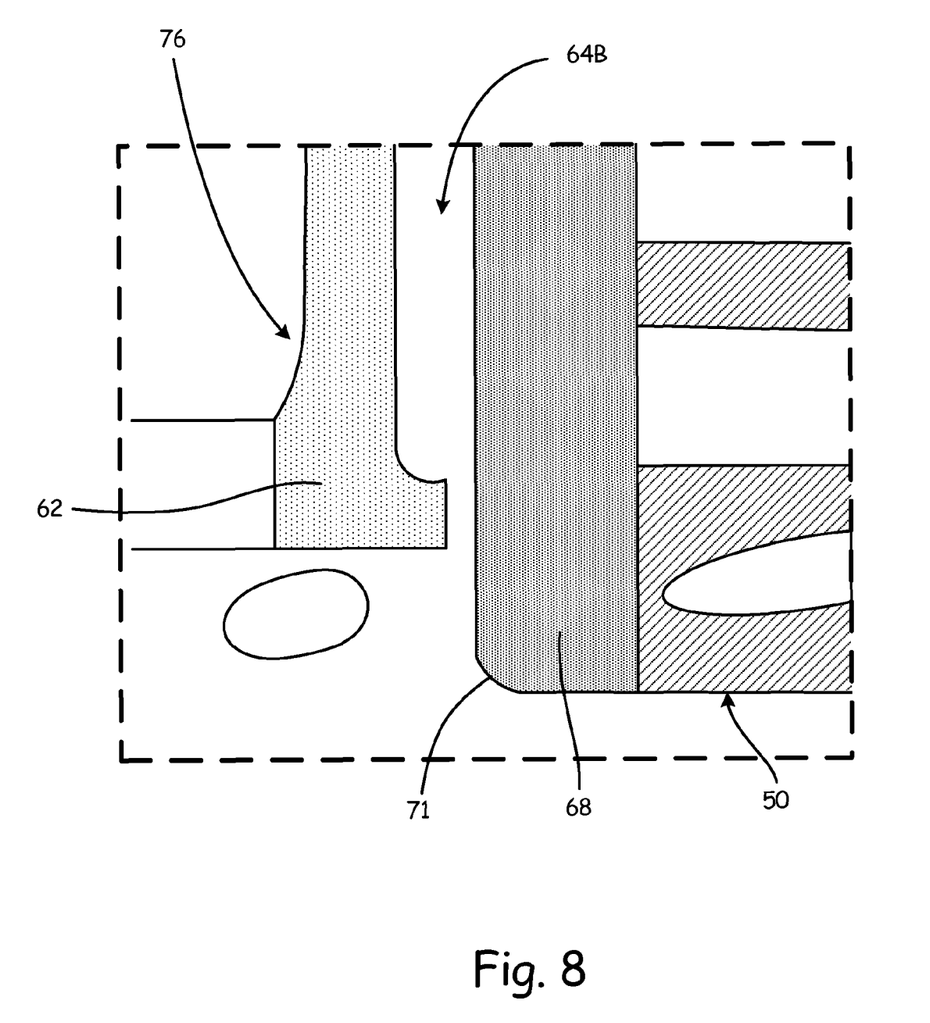
FIG. 8 is a partial cross section view of FIG. 3 illustrating a housing tip, bushing tip and BOAS.

FIG. 8 is a partial cross section view of FIG. 3 illustrating housing tip 62, bushing tip 68 and BOAS 50. Housing tip 62 includes cutout portion 76 where housing tip 62 is thinned. Cutout portion 76 provides a contact and sealing surface between probe 52 and housing 58 to prevent gas ingestion near cavity 70.

Discussion of Possible Embodiments

The following are non-exclusive descriptions of possible embodiments of the present disclosure.

A probe cooling system for a gas turbine engine can include a probe housing and a bushing disposed between an end of the probe housing and a gas path, the bushing extending from the end of the probe housing to form a cavity. The system can also include a first plenum defined within the probe housing and configured to direct air from an internal cooling air supply towards the cavity. The system can also include a second plenum defined between the bushing and the probe housing and configured to direct air from the internal cooling air supply towards the cavity.

The system of the preceding paragraph can optionally include, additionally and/or alternatively, any one or more of the following features, configurations and/or additional components:

A further embodiment of the foregoing system can include a third plenum extending through a wall of the bushing and into the second plenum.

A further embodiment of any of the foregoing systems can include a fourth plenum extending through a wall of the bushing and into the cavity.

A further embodiment of any of the foregoing systems can include that the probe housing is at least partially located in a blade outer air seal of a gas turbine engine.

A further embodiment of any of the foregoing systems can include that the internal cooling air supply supplies air for cooling the blade outer air seal.

A further embodiment of any of the foregoing systems can include a microwave sensor probe positioned within the probe housing.

A further embodiment of any of the foregoing systems can include a temperature sensor positioned within the probe housing.

A further embodiment of any of the foregoing systems can include a plurality of probes positioned within the probe housing.

A further embodiment of any of the foregoing systems can include that the first plenum is configured to pressurize the probe housing.

A further embodiment of any of the foregoing systems can include a radial split on the probe housing.

A further embodiment of any of the foregoing systems can include that the first and second plenums are configured such that an air pressure in the first plenum is greater than an air pressure in the second plenum, and the air pressure in the second plenum is greater than an air pressure in the cavity.

A further embodiment of any of the foregoing systems can include that an inner portion of the probe housing is cutaway to provide a contact and sealing surface between the probe and the probe housing.

A method of cooling a probe can include positioning a probe having a probe tip proximate a gas path and directing air from an internal cooling air supply through a plurality of plenums towards the probe tip.

The method of the preceding paragraph can optionally include, additionally and/or alternatively, any one or more of the following features, configurations and/or additional components:

A further embodiment of the foregoing method can include securing the probe within a housing.

A further embodiment of any of the foregoing methods can include that directing air from the internal cooling air supply through the plurality of plenums pressurizes the probe housing.

A further embodiment of any of the foregoing methods can include that the housing is at least partially located in a blade outer air seal of a gas turbine engine.

A further embodiment of any of the foregoing methods can include creating a bather of cooling air between the probe tip and the gas path by directing cooling air through a wall of a bushing and into a cavity of the blade outer air seal.

A further embodiment of any of the foregoing methods can include that a first plenum is located between the probe and a probe housing, and wherein a second plenum is located between the probe housing and a bushing.

While the disclosure has been described with reference to an exemplary embodiment(s), it will be understood by those skilled in the art that various changes may be made and equivalents may be substituted for elements thereof without departing from the scope of the disclosure. In addition, many modifications may be made to adapt a particular situation or material to the teachings of the invention without departing from the essential scope thereof. Therefore, it is intended that the disclosure not be limited to the particular embodiment(s) disclosed, but that the disclosure will include all embodiments falling within the scope of the appended claims.

The invention claimed is:

1. A probe cooling system for a gas turbine engine, the system comprising:
   a probe housing;
   a bushing disposed between an end of the probe housing and a gas path, the bushing extending from the end of the probe housing to form a cavity;
   a first plenum defined within the probe housing and configured to direct air from an internal cooling air supply towards the cavity;
   a second plenum defined between the bushing and the probe housing and configured to direct air from the internal cooling air supply towards the cavity;
   a third plenum extending axially through a wall of the bushing and into the second plenum, the third plenum configured to provide air from the internal cooling supply to the second plenum.

2. The system of claim 1, further comprising: a fourth plenum extending through a wall of the bushing and into the cavity.

3. The system of claim 1, wherein the probe housing is at least partially located in a blade outer air seal of a gas turbine engine.

4. The system of claim 3, wherein the internal cooling air supply supplies air for cooling the blade outer air seal.

5. The system of claim 1, further comprising a microwave sensor probe positioned within the probe housing.

6. The system of claim 1, further comprising a temperature sensor positioned within the probe housing.

7. The system of claim 1, further comprising a plurality of probes positioned within the probe housing.

8. The system of claim 1, wherein the first plenum is configured to pressurize the probe housing.

9. The system of claim 1, wherein the probe housing comprises a radial split.

10. The system of claim 1, wherein the first and second plenums are configured such that an air pressure in the first plenum is greater than an air pressure in the second plenum, and wherein the air pressure in the second plenum is greater than an air pressure in the cavity.

11. The system of claim 5, wherein an inner portion of the probe housing is cutaway to provide a contact and sealing surface between the probe and the probe housing.

12. A method of cooling a probe for a gas turbine engine comprising:
    positioning a probe having a probe tip proximate a gas path;
    securing the probe within a housing, the housing being at least partially located in a blade outer air seal of the gas turbine engine;
    directing air from an internal cooling air supply through a plurality of plenums towards the probe tip; and
    creating a barrier of cooling air between the probe tip and the gas path by directing cooling air axially through a wall of a bushing and into a cavity of the blade outer air seal.

13. The method of claim 12, wherein directing air from the internal cooling air supply through the plurality of plenums pressurizes the probe housing.

14. The method of claim 12, wherein a first plenum is located between the probe and a probe housing, and wherein a second plenum is located between the probe housing and the bushing.

* * * * *

UNITED STATES PATENT AND TRADEMARK OFFICE
CERTIFICATE OF CORRECTION

PATENT NO. : 9,856,748 B2
APPLICATION NO. : 14/625370
DATED : January 2, 2018
INVENTOR(S) : Blaine M. Johnston et al.

Page 1 of 1

It is certified that error appears in the above-identified patent and that said Letters Patent is hereby corrected as shown below:

In the Specification

Column 5, Line 56:
Delete "bather"
Insert --barrier--

Column 7, Line 28:
Delete "bather"
Insert --barrier--

Signed and Sealed this
Fifth Day of June, 2018

Andrei Iancu
*Director of the United States Patent and Trademark Office*